United States Patent [19]

Frahme

[11] Patent Number: 4,605,583

[45] Date of Patent: Aug. 12, 1986

[54] HEAT INSULATING MODULE FOR A HIGH TEMPERATURE CHAMBER

[75] Inventor: Carl E. Frahme, Canyon Country, Calif.

[73] Assignee: Industrial Insulations, Inc., City of Industry, Calif.

[21] Appl. No.: 635,974

[22] Filed: Jul. 30, 1984

[51] Int. Cl.[4] .......................... B32B 3/02; E04B 1/62; E04B 1/80

[52] U.S. Cl. ...................................... 428/126; 52/506; 52/509; 52/511; 52/596; 428/134; 428/181; 428/182; 428/920; 428/192

[58] Field of Search ............... 428/182, 920, 134, 126, 428/181, 192; 52/509, 506, 596, 511, 513, 277, 279, 227

[56] References Cited

U.S. PATENT DOCUMENTS

| | | | |
|---|---|---|---|
| 3,832,815 | 9/1974 | Balaz et al. | 428/920 |
| 3,854,262 | 12/1974 | Brady | 52/506 |
| 4,001,996 | 1/1977 | Byrd, Jr. | 428/126 |

FOREIGN PATENT DOCUMENTS

| | | |
|---|---|---|
| 0018677 | 12/1981 | European Pat. Off. . |
| 2004626A | 4/1979 | United Kingdom . |

*Primary Examiner*—Paul J. Thibodeau
*Attorney, Agent, or Firm*—Sellers and Brace

[57] ABSTRACT

Disclosed is a heat insulating module for use in forming a lining for a high temperature chamber. The module has a main body formed by a blanket of refractory fibers folded into pleats held compressed against one another by a pair of spaced apart tubular members traversing the opposite end portions of all except the two end layers and spaced inwardly near the cold face of the module. The ends of the tubular members are secured to the upright legs of respective L-shaped mounting members with the other legs thereof lying in a common plane generally parallel to the cold face of the module and anchorable to respective fastener studs securable to the wall of the chamber being insulated.

7 Claims, 2 Drawing Figures

HEAT INSULATING MODULE FOR A HIGH TEMPERATURE CHAMBER

Figure 1:
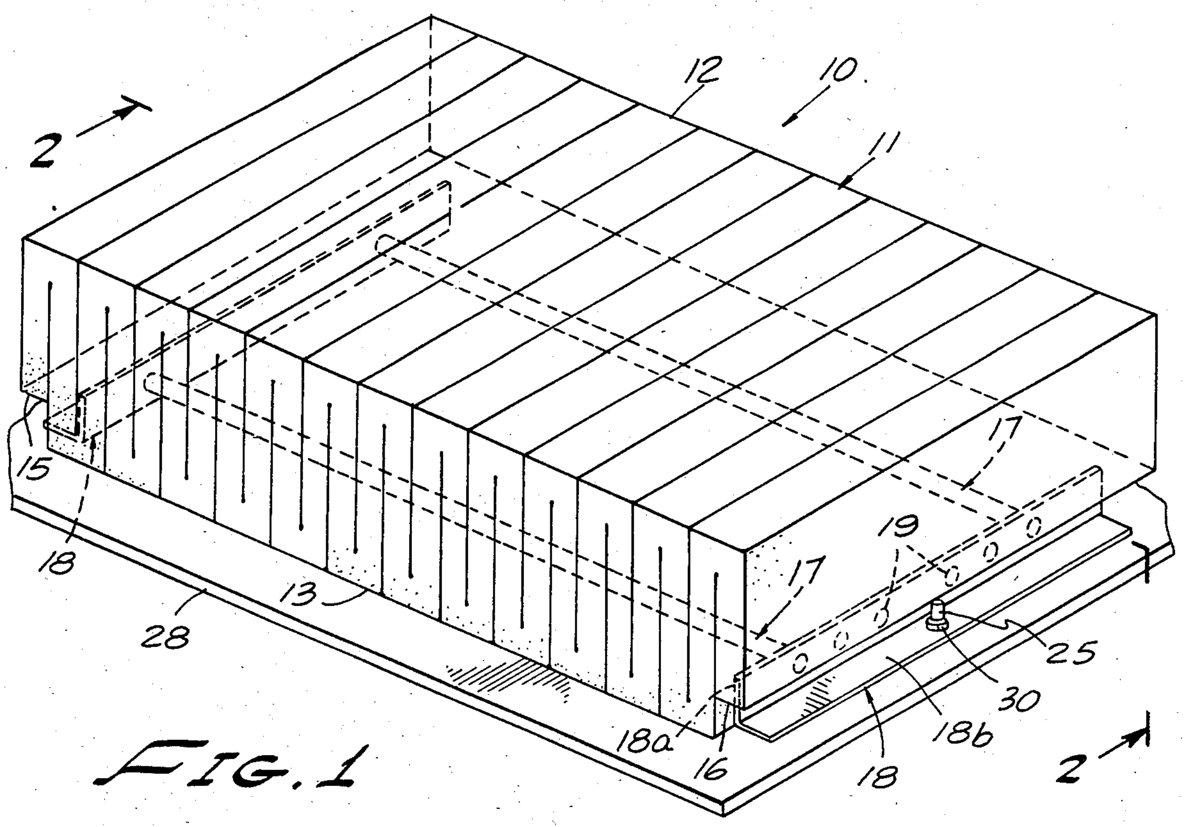

This invention relates to high temperature heat insulating linings, and more particularly to a unique and improved heat insulating module of simplified construction readily installable in abutment with other similar modules to provide a high temperature lining for furnaces and the like chambers.

BACKGROUND OF THE INVENTION

Various proposals have been made heretofore for providing a lining for a furnace and the like high temperature chambers avoiding the disadvantages of rigid refractory materials such as bricks and cast components. Such proposals involve the use of refractory fibers formed into mats, blankets and other configurations. The refractory or ceramic fibers are customarily laid down in randomly arranged layers interbonded to one another at points of cross over. Typically, chambers insulated with refractory fibers operate in a temperature range of 1,600° to 2,800° F. and satisfactory insulation utilizing refractory fibers requires an insulation thickness of 4–6 inches or more. If blankets of such fibers are applied with the layers lying generally parallel to the chamber wall, serious problems are encountered including those of securing blankets to the wall and particularly the problem of delamination or peeling off of successive surface layers progressively and after a relatively short service life. To avoid these problems and others associated therewith it has been the practice to utilize a wide variety of arrangement in which blankets of fibers one to two inches thick are secured to the chamber wall with the fiber layers lying in planes generally normal to the chamber wall. This avoids the serious delamination and spalling problems but presents other problems associated with the assembly of liner modules or components formed of multiple layers held assembled in side-by-side relation and provided with suitable heat resistant means for securing the assembly to the chamber wall. Patents in this art dealing with these problems and proposing different solutions include: Sauder et al, U.S. Pat. No. 3,819,468; Balaz et al, U.S. Pat. No. 3,832,815; Brady, U.S. Pat. No. 3,854,262; Monaghan, U.S. Pat. No. 3,892,396; Sauder et al, U.S. Pat. No. 3,940,244; Byrd, U.S. Pat. No. 3,952,470; Byrd, U.S. Pat. No. 4,001,996; Byrd, U.S. Pat. No. 4,012,877; Byrd, U.S. Pat. No. 4,103,469; Myles, U.S. Pat. No. 4,120,641; Byrd, U.S. Pat. No. 4,123,886; Cunningham et al, U.S. Pat. No. 4,218,962; Severin et al, U.S. Pat. No. 4,287,839 and Hounsel et al, U.S. Pat. No. 4,381,634.

The two Sauder patents propose a complex module assembly formed of a multiplicity of individual strips of refractory fiber bonded along one edge to expanded metal backing or held assembled to a backing layer of fibers by means of a complex series of tie wires criss crossing one another. The several Byrd patents show different techniques for folding a ceramic blanket with certain folds embracing an elongated anchor member provided with tang means protruding outwardly through the fold with its outer end clenched to an elongated mounting strip securable to a furnace wall.

The Cunningham and Housel patents show closely related variants of the several Byrd teachings. Balaz and Brady both propose modules composed of separate strips of refractory fibers required to be assembled in side-by-side relation and held assembled by a plurality of pins on which all strips are impaled and secured to retaining members at the opposite ends of the pins. Brady's clamping pins are staggered relative to one another and the retaining members are secured to a mounting plate coextensive with the outer edges of the strips and securable to a furnace chamber, whereas Palaz extends his pins through eye bolts employed to clamp the modules to the chamber wall. Monaghan secures one end of L-shaped mounting hooks to the chamber wall and having a pointed leg extending upwardly and spaced from the wall. Individual strips of insulating fibers are then impaled over the upright legs. Miles places a multiplicity of ceramic fiber strips in side by side relation and bonds one lateral edge to an expanded metal mounting strip. The module is then secured to the wall by round-ended buttons forcibly inserted into respective expanded metal openings.

Severin et al proposes a pleated ceramic fiber blanket utilizing a multiplicity of components including a channel shaped base plate, a pair of rods piercing all pleats and having their ends anchored in tabs secured to the base plate and provided at its corners with J-shaped suspension bolts engageable with pairs of rods mounted on the interior of a furnace wall.

SUMMARY OF THE INVENTION

This invention avoids the complexities and costly manipulative operations required to manufacture, assemble prior heat insulating modules and to mount them on a chamber wall. These advantages are achieved by folding a single unitary length of refractory fiber blanket into a plurality of similar folds held compactly compressed against one another by a pair of tie members traversing all except the end layers of the module and secured at the ends thereof to L-shaped module mounting members. Each of the mounting members has an upright leg coplanar with the interface between a respective pair of module end layers with the other or cold leg of all mounting members lying in a common plane coplanar with the cold face of the module. The tie members and the module mounting members hold the layers compactly assembled with the opposite faces of the module parallel and firmly stabilized relative to one another. Fluted studs extend through the cold legs of the mounting members and are rigidly secured to the chamber wall by threaded nuts having a forced telescopic fit over the flutes and highly effective in anchoring the module to the chamber wall.

Accordingly, it is a primary object of this invention to provide an improved lightweight simply-constructed heat insulating module formed from a refractory fiber blanket folded into similar layers held compressed against one another by tie members anchored to L-shaped module mounting members having one leg coplanar with the interface between a respective pair of module end layers.

Another object of the invention is the provision of a high temperature heat insulating module formed from a one-piece refractory fiber blanket folded into similar layers held compactly against one another by tie members extending through all except the two end layers and connected to one leg of an L-shaped mounting member coplanar with the interface between a respective pair of end layers with the other leg extending outwardly crosswise of the adjacent end layer and generally flush with the cold face of the module.

These and other more specific objects will appear upon reading the following specification and claims and upon considering in connection therewith the attached drawing to which they relate.

Figure 2:
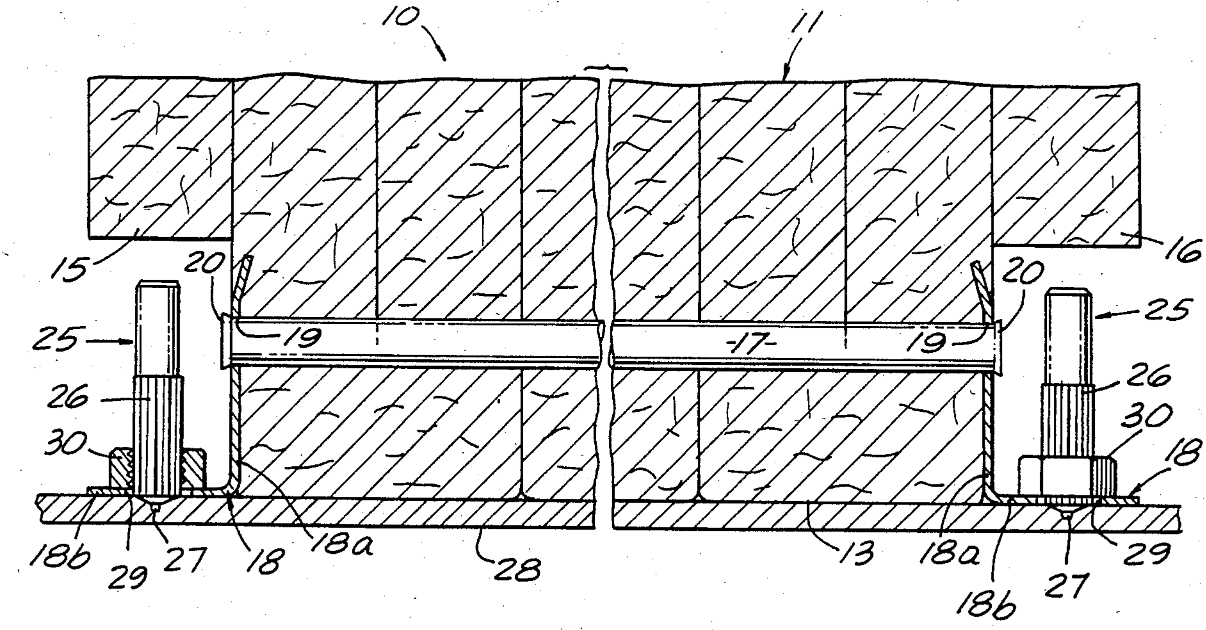

Referring now to the drawing in which a preferred embodiment of the invention is illustrated:

FIG. 1 is a perspective view of a heat insulating module incorporating the features of the invention with the outer mounting surface thereof lying closely against a supporting chamber wall; and FIG. 2 is a fragmentary cross sectional view on an enlarged scale taken along line 2—2 on FIG. 1.

Referring to the drawing, there is shown an exemplary embodiment of the invention module designated generally 10. As there shown, the module is rectangular and has a main body formed from a single unitary blanket 11 formed of superimposed layers of refractory ceramic fibers. In commercially available blankets of such fibers selected to provide long service life under temperature conditions of 2,600° F. or higher, the fibers are arranged randomly to one another in layers parallel to the blanket faces. In consequence, when such blankets are folded into similar pleats with the pleat layers compressed together, as shown, the fibers in the layers lie normal to the two parallel faces 12 and 13. As here shown, the blanket folds forming face 12 of the module are exposed to the high temperature of the chamber being insulated and form the hot face of the module, whereas the folds on the other face 13 face toward the chamber wall and constitute the cold face of the module.

Preferably, a length of blanket material is employed and folded into rectangular pleats with one more fold adjacent the hot face 12 than adjacent the cold face 13. The two end layers are not as wide as the other layers and, in consequence, their ends 15, 16 are spaced from the cold side of the module as shown in FIGS. 1 and 2. This expedient substantially expedites assembly of the module to the furnace wall for reasons which will become apparent presently.

The pleats or layers of the module are held compactly and firmly assembled by a plurality of tie members 17 having their opposite ends anchored to L-shaped module mounting members 18 each formed of high temperature resistent metal such as stainless steel. Preferably, tie members 17 are tubular and formed of stainless steel or the like. Ties 17 are forcibly inserted by a power tool applied to one end thereby forcing the other end to pierce the module layers in a path close to inner sides of the folds or return bends forming the cold face 13 of the module. Prior to insertion of the tie members 17, the longer legs 18*a* of the L-shaped mounting members 18 are inserted between the abutting faces of the end pair of module layers and with the shorter legs 18*b* lying flush with the outer or cold face 13 and extending outwardly across the end edges 15 and 16 of the blanket. Legs 18*a* are provided with one or more holes 19 sized to accommodate the tie members 17. The tie members are assembled through the holes 19 and then upset outwardly as indicated at 20 to secure them firmly assembled with the intervening layers of the blanket firmly compressed against one another.

Module 10 is secured to a surface or other high temperature chamber wall or ceiling by suitable fasteners such as the studs 25 best shown in FIG. 2. One end of these studs is provided with a ring of outwardly projecting axial flutes 26 of triangular cross section. The adjacent ends of the studs also include an axial projection 27 to facilitate resistence welding of the studs to the furnace wall 28. Usually the extension 27 is fused and destroyed during the welding operation and substantially the entire end surface of the stud becomes welded to the furnace wall. Legs 18*b* of the mounting members are provided with one or more holes 29 freely accommodating the studs 25. Since the end surfaces 15, 16 of the respective end layers of the module terminate above the adjacent ends of studs 25, the workman is afforded a clear view of legs 18*b* and of the alignment of the holes 29 with their respective fastener studs 25. Also the assembly of nuts 30 to the studs is facilitated and expedited. These nuts are threaded and have a loose sliding fit over the cylindrical ends of the studs but have an interference fit with the flutes 26 when forcibly telescoped thereover until they press legs 18*b* of the mounting members against the chamber wall. The hardened flutes cut into the nut threads and provide a high strength fastener assembly sufficiently and adequately strong to hold the light weight module 10 firmly installed. Sometimes the nuts 30 are turned through a short arc after being fully telescoped over the studs to provide a somewhat stronger assembly. A pair of fastener studs at each end of the module is found satisfactory for smaller modules. Larger module assemblies may employ a pair of studs at each end.

While the particular heat insulating module for a high temperature chamber herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A heat insulating module for use in lining a high temperature chamber comprising:

a blanket of refractory fibers folded into a plurality of adjacent layers interconnected along the lateral edges of said layers by folds the outermost portions of alternate ones of which folds lie generally in spaced apart first and second parallel planes;

the opposite ends of said folded blanket spaced inwardly from the first one of said planes;

a plurality of L-shaped module mounting members having a first leg of each extending crosswise of a respective end of said blanket and a second leg of each lying coplanar with the interface between a respective adjacent pair of said blanket layers;

a plurality of tie members extending crosswise of said blanket layers and through a respective opening in said second legs of said L-shaped members and secured against disassembly therefrom and having a length effective to hold the layers of said blanket traversed thereby snugly pressed together; and said first legs of said L-shaped mounting members lying generally coplanar with said first plane and provided with fastener means for securing said mounting members to a chamber side including a plurality of studs provided along one end thereof with a ring of low-height sharp edged axial flutes, said one end of said studs being rigidly securable normal to the inner wall of a high temperature chamber, and said first leg of said mounting members having an opening to receive said studs, and ring-like retainer means adapted to be forcibly assembled over said flutes and cooperating therewith to hold said mounting members assembled thereto.

2. A heat insulating module as defined in claim 1 characterized in that the fluted end of said studs is provided with a small short axial protrustion useful in securing said studs to a metallic chamber wall by electric welding.

3. A heat insulating module as defined in claim 1 characterized in that said tie members are tubular and the opposite ends of said tie members being upset outwardly of the remote faces of said second legs of said mounting members and effective to hold the same assembled to said second legs of said L-shaped members.

4. A heat insulating module as defined in claim 1 characterized in the provision of a single L-shaped mounting member for each end of said folded refractory blanket.

5. A heat insulating module for use in lining a high temperature chamber comprising:

a unitary elongated blanket of refractory fibers folded crosswise thereof into a plurality of rectangular side-by-side layers with the opposite ends spaced inwardly from one face of said module;

a plurality of L-shaped mounting members having a first leg thereof coplanar with the interface between a respective pair of said layers at the opposite ends of said folded blanket and with the second legs thereof extending in opposite directions and lying against and crosswise of the adjacent end of said blanket and generally inwardly of said one face of said module;

a pair of rigid tie members extending crosswise of all except the two remotely-spaced end layers of said module, said tie members being generally parallel and located inwardly of the opposite ends of said layers and adjacent the return bend of said folds on said one face of said module and having the ends of said tie members secured to the adjacent one of said first legs of said L-shaped mounting members and cooperating with said first legs to hold the blanket layers traversed thereby pressed compactly together; and separate fastener means operably associated with said second legs of said mounting members and securable to a chamber wall to hold said module mounted thereon.

6. A heat insulating module as defined in claim 5 characterized in that said tie members are tubular and have the opposite ends thereof upset radially outwardly on the remotely spaced surfaces of said first legs of said L-shaped mounting members to hold the same assembled to said mounting members.

7. A heat insulating module as defined in claim 5 characterized in that said fastener means comprises a stud fluted axially thereof and adapted to have one end thereof welded to a chamber wall, and threaded nut means sized for forcible telescopic assembly over said flutes and thereby effective to hold said module assembled to a chamber wall.

* * * * *